United States Patent Office 2,814,651
Patented Nov. 26, 1957

2,814,651

TETRAALKYLBENZENE PROCESS

David A. McCaulay, Chicago, Ill., assignor to Standard Oil Company, Chicago, Ill., a corporation of Indiana No Drawing. Application July 26, 1955,
Serial No. 524,571

4 Claims. (Cl. 260—668)

This invention relates to the preparation of tetraalkylbenzenes. More particularly it relates to the disproportionation of trimethylbenzene in the presence of certain polyethylbenzenes to produce tetraalkylbenzenes.

Very recently the chemical industry has become intensely interested in tetraalkylbenzenes wherein the alkyl group is either methyl or ethyl. These tetraalkylbenzenes may be converted to various alkyl benzoic acids; particularly there is interest in the benzene nucleus containing 4 carboxylic groups. Most interest is concentrated in the tetramethylbenzene having the durene configuration, i. e., 1,2,4,5- which leaves two unsubstituted ring positions in para orientation.

The tetramethylbenzenes are not particularly plentiful in either coal carbonization liquids or in catalytic reformate from conversion of petroleum naphthas. Furthermore, the close-boiling aromatic hydrocarbons containing a total of 10 carbon atoms make the problem of obtaining high purity tetramethylbenzenes exceedingly difficult and expensive. Catalytic reformate from the conversion of petroleum naphtha does contain quite large amounts of benzenes containing a total of 9 carbon atoms, primarily trimethylbenzenes and ethyltoluenes. It is possible by fractional distillation to obtain a fraction consisting essentially of about 90 mole percent trimethylbenzenes and not more than about 10 mole percent of ethyltoluene; with some loss in yield of trimethylbenzene, it is feasible to reduce the ethyltoluene content to on the order of 5%. Pseudocumene can be obtained in high purity, i. e., 95% or more, by careful distillation of a trimethylbenzene fraction.

Although trimethylbenzenes disproportionate in the presence of liquid HF catalyst to produce high yield of tetramethylbenzenes, the necessary contacting times at lower temperatures are rather long. This is particularly true when operating with relatively low catalyst usages as well as at relatively low temperatures.

An object of this invention is the production of tetraalkylbenzenes, particularly those having the durene configuration, namely 1,2,4,5-. Another object is a more rapid process for disproportionating trimethylbenzenes to a mixture of tetramethylbenzenes. Other objects will become apparent in the course of the detailed description.

In the process of this invention, a trimethylbenzene or mixture thereof and either diethylbenzene or triethylbenzene is contacted with liquid HF catalyst. The mole ratio of trimethylbenzene to diethylbenzene or triethylbenzene is between about 20:1 and 2:1. The contacting is carried out at a temperature between about 80° C. and 190° C. using between about 25 and 400 volume percent of catalyst, based on the hydrocarbon feed. The contacting time is between about one minute and 60 minutes, where the longer times correspond to the lower temperatures and the lower HF usages. The hydrocarbon product mixture contains tetramethylbenzene and ethyltrimethylbenzene as the tetraalkylbenzene product, trimethylbenzenes and unconverted polyethylbenzenes as well as xylene and ethylbenzene by-product.

The trimethylbenzene charged to the process may be any one of the isomers or a mixture of two or all of the isomers. The isomeric trimethylbenzenes are hemimellitene, pseudocumene and mesitylene. The trimethylbenzene portion of the feed may be either essentially pure material or it may contain amounts of ethyltoluene, preferably not more than about 5 mole percent of ethyltoluene.

Some non-aromatic hydrocarbons may be present. The presence of non-aromatic hydrocarbons introduces a complication in the purity of the product and also cracking reactions are introduced at the higher temperatures of operation. Some of the cracked non-aromatic hydrocarbons alkylate the benzene hydrocarbons with a consequent loss of benzene hydrocarbons to undesired by-products. A suitable source of trimethylbenzene feed is the $C_9$ fraction obtained by extractive distillation of a catalytic reformate fraction; this extracted aromatic-rich $C_9$ fraction which contains on the order of not more than 5 volume percent of non-aromatic hydrocarbons is fractionally distilled to eliminate substantially all of the $C_9$ aromatic hydrocarbons which do not boil closely about the trimethylbenzene range. A trimethylbenzene concentrate containing 10 mole percent of ethyltoluenes and some non-aromatic hydrocarbons is readily obtained. By careful distillation it is possible to reduce the ethyltoluene content of the concentrate to about 5 mole percent. A particularly suitable feed for the process is obtainable from the $C_9$ aromatic hydrocarbon fraction produced by glycolic solvent extraction of catalytic reformate; this fraction contains essentially no non-aromatic hydrocarbon component; thus it is possible to produce by fractional distillation a concentrate containing between about 5 and 10 mole percent of ethyltoluenes and the remainder essentially only trimethylbenzenes. A source of essentially pure trimethylbenzenes is the product from the disproportionation of xylenes using liquid HF catalyst and particularly liquid HF-BF₃ catalyst.

In addition to the trimethylbenzenes, the hydrocarbon feed to the process contains diethylbenzene, triethylbenzene or mixtures of these two. It is preferred to use essentially pure diethylbenzene or triethylbenzene, although impurities such as ethylxylene may be present without significant effect on the reaction product distribution.

The presence of diethylbenzene and/or triethylbenzene in the hydrocarbon feed appears to promote the rate of disproportionation of the trimethylbenzene to form tetramethylbenzene; some ethyltrimethylbenzene is also formed by interaction between the trimethylbenzene and the defined polyethylbenzene. The presence of an appreciable amount of the defined polyethylbenzene is necessary. In general, the mole ratio of trimethylbenzene to defined polyethylbenzene is between about 20:1 and 2:1 and preferably between about 5:1 and 2:1.

The process is carried out in the presence of a liquid HF catalyst. The catalyst utilized in the process may be anhydrous liquid hydrogen fluoride or substantially anhydrous liquid hydrogen fluoride, for example, commerical anhydrous hydrofluoric acid. In order to maintain a high level of catalyst activity, the liquid HF catalyst should contain not more than about 2 or 3 weight percent of water.

In order to maintain the water content of the system at a low level, the entire process is carried out under substantially anhydrous conditions, i. e., the feed hydrocarbons themselves must be of low water content in order to avoid introducing deleterious amounts of water into the system.

The amount of liquid HF catalyst used in general is between about 25 and about 400 volume percent based on the hydrocarbon feed to the process. In some instances, more or less may be used. Owning to the favorable effect of the defined polyethylbenzene on disproportionation rate, it is preferred to operate with lower amounts of catalyst, between about 50 and 100 volume percent based on hydrocarbon feed to the process.

The process may be carried out within the range of about 80° C. and 190° C. Operating times below 80° C. are usually unattractively long. Operation at above 190° C. introduces side reactions such as cracking of the ethyl groups. Owing to the favorable effect of the presence of the defined polyethylbenzene on the rate of disproportionation, it is preferred to operate at the intermediate temperatures, between about 100° C. and 150° C.

The rate of disproportionation of the trimethylbenzene is dependent upon not only the temperature of contacting but also upon the amount of liquid HF catalyst in the contacting zone. At a fixed catalyst usage, the lower the temperature of contacting the longer the corresponding time needed to reach a fixed amount of disproportionation. At constant temperature, the lower the catalyst usage, the longer the time needed to attain a fixed amount of disproportionation. Thus at a given amount of disproportionation the necessary contacting time is longer at the lower temperatures and the lower catalyst usages. In general, when utilizing the trimethylbenzene and defined polyethylbenzene feed, about equilibrium conditions are attained in the disproportionation reaction, i. e., about 50% disproportionation of the trimethylbenzene in about 60 minutes time at about 80° C., and in as little as one minute when the contacting is at about 190° C. When operating at the preferred HF usage of between about 50 and 100 volume percent and the preferred temperature of about 100° C. and 150° C., the contacting times are between about one minute and 30 minutes, the longer times corresponding to the lower temperatures.

It is to be understood that the process of this invention is a liquid phase reaction and sufficient pressure must be maintained on the system in order to keep both the feed hydrocarbons and the HF catalyst in the liquid state.

Durene, which has a melting point of about 80° C., is very readily separated by fractional crystallization from the isodurene and prehnitene isomers which melt respectively at −24° C. and −6° C. Thus by a very simple conventional fractional crystallization procedure it is possible to separate essentially pure durene from the tetramethylbenzene product of this process. Since isodurene and prehnitene have a boiling point difference of about 7° C., high purity prehnitene may be readily produced by fractional distillation of the mother liquor from the fractional crystallization procedure.

In the process, ethyltrimethylbenzenes are formed in addition to the tetramethylbenzenes. These ethyltrimethylbenzenes can be separated by fractional distillation from the tetramethylbenzenes. In the production of tetracarboxylic aromatic acids, both tetramethylbenzenes and ethyltrimethylbenzenes can be charged to the oxidation process; a mixture of tetracarboxylic acid isomers is produced whose isomeric distribution is not changed by the presence of ethyl and methyl groups in the feed. Well known techniques may be used to separate the various isomeric acids. Thus when it is desired to have a feed for the production of tetracarboxylic aromatic acids, the production of ethyltrimethylbenzenes in the process is beneficial with respect to the ultimate yield of acid based on feed to the disproportionation process.

The disproportionation of trimethylbenzene in the presence of the defined polyethylbenzene is set out in the illustrative example, run No. E. For purposes of comparison to show the unexpected and unpredictable results obtained by using the defined polyethylbenzene, runs are set out on disproportionation of pseudocumene alone and trimethylbenzenes in the presence of ethylbenzene and ethyltoluene. The results of this example are set out in Table I.

The runs were carried out in a one-liter Hastelloy autoclave provided with a motor-driven stirrer. In the experimental procedure, the feed hydrocarbon was charged to the autoclave and the whole heated to about 30° C. above the desired reaction temperature. The liquid HF catalyst (commercial anhydrous hydrofluoric acid containing 99.5% HF) was then charged to the autoclave; the desired reaction temperature was thereby reached within a few seconds. The mixture was stirred for the desired time and at the end of this time the entire mixture was withdrawn into a polyethylene flask immersed in a Dry-Ice acetone bath. About one volume of cold water per volume of liquid HF charged was added to the flask. The upper layer of hydrocarbons was separated from the lower aqueous layer. The hydrocarbon layer was neutralized and fractionated through a distillation column providing about 30 theoretical plates. The close-boiling fractions were analyzed by infrared absorption techniques for individual isomer content. The pseudocumene utilized was 99.4% pure; other hydrocarbons were Eastman white label grade.

TABLE I

| Run No. | A | B | C | D | E |
|---|---|---|---|---|---|
| Feed composition, mole percent: | | | | | |
| Pseudocumene | 74 | 100 | 74 | | 100 | 73 |
| Mesitylene | 0 | 0 | 6 | 90 | 0 |
| Hemimellitene | 0 | 0 | 17 | | 0 |
| Ethylbenzene | 26 | 0 | 0 | 0 | 0 |
| Diethylbenzene | 0 | 0 | 0 | 0 | 27 |
| Ethyltoluene | 0 | 0 | 10 | 0 | 0 |
| HF, vol. percent on feed | 100 | 100 | 100 | 100 | 100 |
| Temperature, °C | 100 | 100 | 135 | 135 | 100 |
| Time, minutes | 10 | 10 | 240 | 240 | 10 |
| Product recovery, wt. percent | 97 | 98 | 95 | 96 | 97 |
| Product distribution, mole percent: | | | | | |
| Benzene | Tr. | 0 | 0 | 0 | 0 |
| Toluene | 0 | 0 | 4 | 0 | 0 |
| Ethylbenzene | 24 | 0 | 0 | 0 | 5 |
| Xylene | 1.5 | 6 | 13 | 19 | 5 |
| Trimethylbenzene | 72 | 88 | 61 | 62 | 63 |
| Ethyltoluene | 0 | 0 | 1 | 0 | 0 |
| Diethylbenzene | 0 | 0 | 0 | 0 | 15 |
| Tetramethylbenzene | 1.5 | 6 | 18 | 19 | 5 |
| Ethyltrimethylbenzene | 1 | 0 | 3 | 0 | 5 |
| Higher | Tr. | 0 | Tr. | 0 | 2 |
| Trimethylbenzene conversion, mole percent: | | | | | |
| By disproportionation | 4 | 12 | 35 | 38 | 14 |
| By accepting an ethyl group | 1 | 0 | 4 | 0 | 7 |

*Example*

Five runs were carried out in this example. Run No. B shows the disproportionation of pseudocumene alone at 100° C., 100 volume percent liquid HF catalyst and a time of 10 minutes. Twelve mole percent of the trimethylbenzene was disproportionated to produce 6 mole percent of tetramethylbenzene and 6 mole percent of xylene. In run No. A, a mixture of pseudocumene, monoethylbenzene was contacted under the same conditions as in run No. B. Only 5 mole percent of the trimethylbenzene was converted to tetraalkylbenzenes by disproportionation and interaction. The presence of the monoethylbenzene appears to have suppressed the disproportionation reaction without simultaneously introducing any significant amount of interaction.

In run No. D, pseudocumene was disproportionated at 135° C., 100 volume percent liquid HF and 240 minutes. Thirty-eight percent of the pseudocumene was disproportionated in run No. D. In run No. C, a mixture of trimethylbenzenes and ethyltoluene was contacted under the same conditions as in run No. D. In run No. C, 35% of the trimethylbenzene disproportionated and 4% interacted to produce a total conversion of 39 mole percent. The conversion of trimethylbenzene in runs C and D is believed to have been within experimental error and therefore it appears that ethyltoluene in this amount has no significant effect on the disproportionation of trimethylbenzenes.

Run No. E was carried out on a mixture of pseudocumene and diethylbenzene at 100° C., 100 volume percent liquid HF and 10 minutes, i. e., the conditions of runs A and B, except for the feed. In run No. E, 14% of trimethylbenzene was disproportionated to tetramethylbenzene and 7% interacted to form ethyltrimethylbenzene, a total conversion of 21% of the trimethylbenzene. Thus in run No. E, about five times as much trimethylbenzene was converted as in run No. A where ethylbenzene was present and about twice as much as in run No. B where pseudocumene alone was present. It is significant that in run No. E more trimethylbenzene disproportionated than in run No. B. Thus the presence of the diethylbenzene not only promotes interaction but also promotes the disproportionation reaction itself.

In the example, the hydrocarbons have been separated from the HF catalyst by quenching the system with cold water. Since this procedure produces a dilute acid which is of no value for reuse without reprocessing, it is primarily a laboratory technique. At about 100° C. the trimethylbenzenes are soluble in liquid HF to the extent of about 15 volume percent so that two phases always exist in the contacting zone. The hydrocarbon phase may be separated from the acid phase by decantation or other physical separation means. When the conversion is being carried out so that the equilibrium mixture of tetramethylbenzenes is the product, the separated acid phase containing dissolved hydrocarbons may be recycled directly to the contacting zone. Or the HF may be recovered in a substantially pure form by distilling or flashing the HF away from the higher boiling dissolved hydrocarbons. Owing to the very low boiling point of liquid HF, this separation may be carried out under pressure without cooling the liquid HF too greatly.

Thus having described the invention, what is claimed is:

1. A process for preparing tetramethylbenzene comprising contacting, under substantially anhydrous conditions, a feed consisting of at least one trimethylbenzene and at least one member of the class consisting of diethylbenzene and triethylbenzene, in a mole ratio of trimethylbenzene to said defined polyethylbenzene of between about 20:1 and 2:1 with liquid HF catalyst in an amount between about 25 and 400 volume percent based on hydrocarbon feed at a temperature between about 80° C. and 190° C. for a time between about 1 minute and 60 minutes, the longer times corresponding to the lower temperatures and lower HF usages, removing HF from a hydrocarbon product mixture comprising tetramethylbenzene, ethyltrimethylbenzene and unconverted feed hydrocarbons.

2. The process of claim 1 wherein said HF usage is between about 50 and 100 volume percent.

3. The process of claim 2 wherein the temperature is between about 100° C. and 150° C. and the time is between about 1 minute and 30 minutes, the longer times corresponding to the lower temperatures.

4. A process comprising contacting, under substantially anhydrous conditions, a feed consisting of at least one trimethylbenzene and diethylbenzene, in a mole ratio of trimethylbenzene to diethylbenzene between about 5:1 and 2:1, with liquid HF in an amount between about 50 and 100 volume percent, based on feed hydrocarbons, at a temperature between 100° C. and 150° C. for a time between about 1 minute and 30 minutes, the longer times corresponding to the lower temperatures, removing HF from a hydrocarbon product mixture comprising tetramethylbenzene, ethyltrimethylbenzenes, and unconverted feed hydrocarbons, separating tetraalkylbenzenes from said mixture, which process is characterized by a higher yield of tetraalkylbenzene than operation without said diethylbenzene in the contacting zone.

References Cited in the file of this patent
UNITED STATES PATENTS
2,416,184     Lee et al. _____ Feb. 18, 1947